Patented Sept. 29, 1936

2,055,468

UNITED STATES PATENT OFFICE

2,055,468

PROCESS FOR POLYMERIZING VINYL COMPOUNDS

Stuart D. Douglas, Charleston, W. Va., assignor, by mesne assignments, to Union Carbide and Carbon Corporation, a corporation of New York No Drawing. Application January 9, 1934, Serial No. 705,894

9 Claims. (Cl. 260—2)

Vinyl resins may be made by the polymerization of various vinyl compounds, and many processes for producing these artificial resinous materials are known. For example, Patent 1,586,803 states that the presence of water is an aid in the polymerization of vinyl organic esters, such as vinyl acetate and vinyl butyrate, and Patent 1,710,825 proposes to polymerize such esters in liquid media which are solvents for the polymers produced to obtain solutions of the resin. In Patent 1,935,577 issued to E. W. Reid, there is proposed an entirely new type of reaction designated as conjoint polymerization in which vinyl organic esters, such as vinyl acetate, and vinyl halides, such as vinyl chloride, are polymerized while in mutual contact to form improved resinous products. In application Ser. No. 565,207, E. W. Reid disclosed a process for making improved resins by conjoint polymerization of vinyl organic esters and vinyl halides or by polymerization of vinyl halides alone in which non-solvent liquid media or no liquid media other than the vinyl compounds are used. C. O. Young and the present applicant showed in Patent 2,011,132 that certain metals with which the vinyl compounds are in contact during polymerization influence the resin-forming reactions. For example, it was there shown that iron, nickel, copper, zinc and the like retard the polymeriation or cause decidedly inferior products to be formed, while lead, aluminum and tin are neutral to or beneficial to the polymerization if present during the action. For these reasons, equipment formed of lead, tin or aluminum, or lined with lead, tin or aluminum has been the only type satisfactory and available for use in the production of vinyl resins. Practically, lead has been found to be superior to tin aluminum for this use.

The object of this invention is to provide an economical, efficient and novel process for the production of vinyl resins. Another object is to make possible the use of steel, alloy steels and other available structural materials in equipment for the production of vinyl resins.

I have discovered a heretofore unsuspected phenomenon which when applied to the production of vinyl resins makes possible the achievement of the objects of this invention. This phenomenon is the fact that vinyl resins may be made with the aid of heat, catalysts, and other known devices for promoting polymerization in equipment formed of ferrous materials, such as the common alloy steels, in the absence of all solvents or other liquid media. If the usual polymerization process employing liquid media is conducted in contact with ferrous materials or alloy steels, the resulting resin is weak, brittle, undesirably colored, contaminated with iron, and otherwise unsatisfactory. Moreover, the iron tends to inhibit the reaction to such an extent as to reduce very greatly the yield of resin.

This discovery may be applied to the polymerization of vinyl halides alone, to vinyl esters of aliphatic acids, such as vinyl acetate, propionate, butyrate and formate, to vinyl benzene, and to the conjoint polymerization of vinyl compounds of the above groups.

I have conjointly polymerized vinyl chloride and vinyl acetate in vessels made of steel and of a nickel-chromium alloy steel of the type commonly known as an "18 and 8" steel, and have found that when all solvent and non-solvent liquids, including water but excluding, of course, excess liquefied vinyl compounds, were absent from this reaction, it proceeded smoothly to give good yields of exceptionally strong, tough, stable and high-melting resin. This resin was not contaminated with iron although made in direct contact with steel. The absence of even traces of iron was proved by negative results obtained when the resin was tested with potassium thiocyanate. When this polymerization was repeated in the same vessel with the same vinyl compounds and catalyst but with the addition of acetone as a polymerizing medium, the resulting resin was so weak, strongly colored, contaminated with iron, and the yield was so low as to render the process virtually useless.

The following example will serve to illustrate one method of practicing this invention:

Vinyl chloride and vinyl acetate were charged into an autoclave in the ratio of 80% vinyl chloride and 20% vinyl acetate, and acetyl benzoyl peroxide was added in an amount equal to 0.3% by weight of the vinyl compounds. The total charge amounted to about 50 liters. The autoclave was made of an austenitic alloy steel containing about 18% chromium and 8% nickel. It was in the form of a horizontal cylinder equipped with an internal multi-bladed screw-type impeller agitator, and was connected to a brine-cooled reflux condenser. A jacket surrounding the body of the autoclave was provided for heating or cooling purposes.

After charging, the autoclave was closed, and the impeller agitator was started at a speed of about 7 R. P. M. The internal pressure on the autoclave was controlled to correspond to an internal temperature of about 27° to 30° C. This control was effected by regulating the temperature of the autoclave by passing steam or cooling water through the jacket.

The total time of polymerization was 72 hours. During the final stages of reaction when the resin became quite viscous, the speed of the agitator was doubled to prevent any possible local overheating of the resin.

After the autoclave was opened, the resin was removed by adding sufficient acetone to dissolve it, and removing the resultant solution. The resin obtained was freed from monomeric vinyl compounds and catalytic residues by precipitating it and washing it with alcohol.

This resin was water-white, strong, tough, stable to heat and light, possessed a high softening point and formed very viscous solutions. In general, it was the best resin of this variety which has thus far been available.

The process of this invention can be used for polymerizing vinyl compounds by all of the usual methods with the sole exception that all liquids other than vinyl compounds must be absent during the reaction. The usual temperatures may be employed, and those temperatures below about 60° C., and preferably below 40° C., are considered best.

Catalysts, such as dibenzoyl peroxide, acetyl benzoyl peroxide, other organic peroxides and lead tetraethyl, which are known to catalyze the polymerization reaction, may be used in this process. In addition, organic acids or organic acid anhydrides may be used to activate the peroxide catalysts, and surprisingly enough the presence of these acids or anhydrides, such as acetic acid or its anhydride, does not cause contamination of the resin with iron, or result in any attack of the metal of the autoclave so long as the system is entirely anhydrous and free from other liquid media.

The advantages resulting from the use of this process are many. In the first place, polymerization in the absence of a solvent results in better types of polymers. Also, it is a material and important advantage to be able to construct equipment for the production of vinyl resins out of standard structural materials, which, of course, means iron, steel, and the alloy steels. The equipment so made is better and stronger than that made with bi-metallic structure, such as lead-lined equipment, and it is easier to construct and to keep in repair. Such equipment represents other improvements in that it facilitates the use of agitation, and various other departures from plain construction. Furthermore, suspended impurities in the resin are decreased by the use of this process, since heretofore the resin has always contained suspended lead and lead compounds formed by the action of the catalysts or other active agencies on the lead-lined equipment.

This description and the examples are not to be considered as limitative but merely as illustrative since modifications of the invention are possible and are included within its scope as defined by the appended claims.

I claim:

1. Process which comprises polymerizing vinyl compounds of the group consisting of vinyl halides, vinyl esters of aliphatic acids, vinyl benzene, and mixtures thereof, with a catalyst in the absence of liquid media other than said vinyl compounds and in the presence of materials of the group consisting of iron, steel and alloy steels which would tend to inhibit the polymerization and to cause the formation of inferior polymerization products in the presence of liquid media.

2. Process which comprises polymerizing vinyl compounds of the group consisting of vinyl halides, vinyl esters of aliphatic acids, vinyl benzene, and mixtures thereof, with a catalyst in the absence of liquid media other than said vinyl compounds and in the presence of an alloy steel containing nickel and chromium which would tend to inhibit the polymerization and to cause the formation of inferior polymerization products in the presence of liquid media.

3. Process which comprises polymerizing vinyl compounds of the group consisting of vinyl halides, vinyl esters of aliphatic acids, vinyl benzene, and mixtures thereof, with a catalyst in the absence of liquid media other than said vinyl compounds and in the presence of an austenitic alloy steel containing about 18% chromium and about 8% nickel, which steel would tend to inhibit the polymerization and to cause the formation of inferior polymerization products in the presence of liquid media.

4. Process which comprises polymerizing vinyl compounds of the group consisting of vinyl halides, vinyl esters of aliphatic acids, vinyl benzene, and mixtures thereof, by the aid of a catalyst in the absence of liquid media other than said vinyl compounds and in the presence of metallic materials which would tend to inhibit the polymerization and to cause formation of inferior polymerization products in the presence of liquid media.

5. Process which comprises conjointly polymerizing vinyl halides and vinyl esters of aliphatic acids by the aid of a catalyst in the absence of liquid media other than said vinyl compounds and in the presence of metallic materials which would tend to inhibit the polymerization and to cause formation of inferior polymerization products in the presence of liquid media.

6. Process which comprises conjointly polymerizing vinyl halides and vinyl esters of aliphatic acids by the aid of a catalyst at a temperature below about 40° C. in the absence of liquid media other than said vinyl compounds and in the presence of metallic materials which would tend to inhibit the polymerization and to cause formation of inferior polymerization products in the presence of liquid media.

7. Process which comprises conjointly polymerizing vinyl halides and vinyl esters of aliphatic acids by the aid of a peroxide catalyst activated with an organic acid or organic acid anhydride in the absence of liquid media other than said vinyl compounds and said acid or anhydride and in the presence of metallic materials which would tend to inhibit the polymerization and to cause formation of inferior polymerization products in the presence of liquid media.

8. Process which comprises conjointly polymerizing vinyl chloride and vinyl acetate by the aid of a catalyst in the absence of liquid media other than vinyl compounds and in the presence of an alloy steel.

9. Process for making a tough and stable resin possessing a high softening point which comprises conjointly polymerizing about 80 parts vinyl chloride and about 20 parts of vinyl acetate by the aid of acetyl benzoyl peroxide at a temperature below about 40° C. in the absence of liquid media other than vinyl compounds and in the presence of an austenitic alloy steel containing about 18% chromium and about 8% nickel.

STUART D. DOUGLAS.